United States Patent
Ochs et al.

(10) Patent No.: US 9,658,119 B2
(45) Date of Patent: May 23, 2017

(54) METHOD AND SYSTEM FOR DETECTION OF ERRATIC SENSOR USING A DYNAMIC THRESHOLD

(71) Applicant: GM GLOBAL TECHNOLOGY OPERATIONS LLC, Detroit, MI (US)

(72) Inventors: David S. Ochs, Torrance, CA (US); Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 559 days.

(21) Appl. No.: 14/204,140

(22) Filed: Mar. 11, 2014

(65) Prior Publication Data
US 2015/0260589 A1  Sep. 17, 2015

(51) Int. Cl.
*G01K 15/00* (2006.01)
*G01K 19/00* (2006.01)

(52) U.S. Cl.
CPC ........... *G01K 19/00* (2013.01); *G01K 15/007* (2013.01); *G01K 2205/00* (2013.01)

(58) Field of Classification Search
None
See application file for complete search history.

(56) References Cited

U.S. PATENT DOCUMENTS

2014/0139374 A1* 5/2014 Wellman ............. G01C 21/165
342/450

\* cited by examiner

*Primary Examiner* — Erica Lin
(74) *Attorney, Agent, or Firm* — Quinn IP Law

(57) ABSTRACT

A system and method for detecting an erratic state of a monitored sensor includes generating a variation value for a monitored signal generated by a monitored sensor and a variation value for an estimated signal estimated based on a predictive signal generated by predictive sensor, where the predictive signal is predictive of the monitored signal. The monitored signal can rapidly fluctuate based on system operating conditions. A dynamic threshold value is generated based on the estimated variation value, and the monitored signal is compared with the dynamic threshold value to determine if the monitored signal is in an erratic state. The detection method is sufficiently sensitive to distinguish between rapid fluctuation of the monitored sensor and an erratic state.

11 Claims, 2 Drawing Sheets

METHOD AND SYSTEM FOR DETECTION OF ERRATIC SENSOR USING A DYNAMIC THRESHOLD

TECHNICAL FIELD

This disclosure relates to detection of an erratic state of a sensor.

BACKGROUND

A sensor in an erratic state is characterized by rapidly changing readings. The conventional method for detecting an erratic sensor is to compute a variation value of the signal output from the sensor, and compare the variation value to a constant threshold. This method does not account for operating conditions which include expected rapid changes in the condition being sensed by the sensor, which when sensed by the sensor cause the sensor to output a rapidly fluctuating signal. Under these conditions, a false indication of an erratic temperature sensor may be given when the constant threshold value is set too low to account for rapidly changing operating conditions, and an erratic temperature sensor may not be detected when the constant threshold value is set higher to account for rapidly changing operating conditions.

A temperature sensor sensing the temperature of a power inverter module in a hybrid powertrain of a vehicle may output a rapidly fluctuating signal when sensing a rapid change in the temperature of the power inverter module, for example, during rapid changes in torque command input to the powertrain. In these operating conditions, use of a constant threshold value for diagnosis of an erratic state of an inverter temperature sensor will fail to distinguish between an inverter temperature sensor that is outputting a rapidly changing signal because it is in an erratic state, and one that is sensing expected rapid changes in temperature due to rapid changes in torque command input to the powertrain and inverter and emitting an expected rapidly fluctuating signal.

SUMMARY

A method for detecting an erratic temperature sensor uses a dynamic threshold value which is compared with a variation value of the temperature signal output from the temperature sensor, where the dynamic threshold value and the temperature signal variation value are generated during a diagnostic period, and may change dynamically from one diagnostic period to the next in response to rapidly changing operating conditions, thus monitoring for an erratic sensor state while compensating for the rapidly changing operating conditions through the use of a dynamic threshold value. The method described herein, in an illustrative example, calculates a variation value of the temperature signal output from a temperature sensor and compares the variation value to a dynamic threshold value. The dynamic threshold value is generated based on a variation value of an estimated temperature, which is estimated based on an output of a second sensor, where the output of the second sensor is predictive of the temperature being sensed by the temperature sensor. The second sensor could be either a physical sensor, a plurality of sensors, or a virtual software equivalent of a sensor, such that the sensor output could include physically sensed, calculated, estimated, and/or commanded signals or a combination of these. The temperature variation value and the estimated variation value are based, respectively, on corresponding samples of the temperature sensor and the second sensor, where the corresponding samples are taken concurrently, e.g., substantially at the same time such that the corresponding samples represent the same operating condition existing at the time the samples are taken.

In one example, the temperature sensor being monitored for an erratic state is a temperature sensor sensing a temperature of a power inverter module. The power inverter module is operatively connected to a motor-generator, for example, in a powertrain of a hybrid vehicle. The power inverter module during certain operating conditions undergoes rapid changes in temperature, such that the inverter temperature sensor generates a rapidly fluctuating temperature signal. The motor-generator includes a stator which outputs a total stator current during operation. An operating relationship exists between the inverter temperature and the total stator current, such that a sensor sensing the motor-generator's total stator current can be used as a second sensor, where the output of the second sensor is predictive of and used to estimate the inverter temperature during system operation. A variation value of the estimated temperature, referred to herein as an estimated variation value, is generated and used to dynamically generate a dynamic threshold value which takes into account the rapid temperature changes in the inverter under normal operation, such that a comparison of the variation value of the temperature sensor signal to the dynamic fault threshold defined by the total stator current signal can be used to diagnose an erratic temperature sensor with a higher level of sensitivity and decreased probability of a false fault indication relative to the conventional method. The result is a diagnostic that can be both more robust to false failure attributable to rapid signal fluctuations resultant from rapidly changing operating conditions and more sensitive to detect an erratic sensor and to distinguish the erratic sensor from a rapidly fluctuating sensor.

A method of diagnosing an erratic sensor includes receiving a monitored signal from a monitored sensor, which in the illustrative example is the inverter temperature sensor, receiving a predictive signal from a predictive sensor, which in the illustrative example is the stator current sensor, and determining an estimated signal based on the monitored signal, where the estimated signal is an estimate of the monitored signal, where in the illustrative example provided herein the estimated signal is an estimated inverter temperature signal. The method further includes determining a monitored variation value of the monitored signal, determining a estimated variation value of the estimated signal, generating a dynamic threshold value based on the estimated variation value, and determining a state of the monitored sensor based on a comparison of the monitored variation value and the dynamic threshold value, where the monitored sensor is diagnosed as being in an erratic state when the variation value of the monitored signal is greater than or equal to the dynamic threshold value. The monitored variation value and the estimated variation value are determined over a diagnostic time period which is the same diagnostic time period for sampling the monitored signal upon which the monitored variation value is based, and for sampling the predictive signal upon which the estimated variation value is based. The dynamic threshold value may be generated by applying a scale factor to the estimated variation value. In one example, the scale faction may be a constant offset value added to the estimated variation value.

Determining the monitored variation value further includes determining a first monitored signal deviation and determining at least a second monitored signal deviation, where the monitored variation value is defined by one of a sum and an average of the first and the second monitored signal deviations. The first monitored signal deviation is based on a magnitude of a difference between a first monitored signal value sampled at a first time and a second monitored signal value sampled at a second time, and the second monitored signal deviation is based on a magnitude of a difference between the second monitored signal value and a third monitored signal value sampled at a third time. The first, second and third times are different and sequential times.

Determining the estimated variation value of the estimated signal further includes determining a first estimated signal deviation and at least a second estimated signal deviation, where the estimated variation value defined by one of a sum and an average of the first and the second estimated signal deviations. The first estimated signal deviation is based on a magnitude of a difference between a first estimated signal value which is estimated based on a predictive signal value sampled at the first time and a second estimated signal value which is estimated based on a predictive signal value sampled at the second time, and the second estimated signal deviation is based on a magnitude of a difference between the second estimated signal value and a third estimated signal value based on a predictive signal value sampled at the third time.

A system for diagnosing an erratic state of a sensor includes a control module in operable communication with a variation determination module, a sensor diagnostic module, a monitored sensor, and a predictive sensor. The control module receives a monitored signal from the monitored sensor and a predictive signal from the predictive sensor, and generates an estimated signal based on the predictive signal. The predictive signal is predictive of the monitored signal and the estimated signal is an estimate of the monitored signal. The system further includes a monitored signal variation value being generated by the variation determination module based on the monitored signal; and an estimated signal variation value being generated by the variation determination module based on the estimated signal. The state of the monitored sensor is determined by the sensor diagnostic module based on the variation value of the monitored signal and the variation value of the estimated signal value. The system includes the sensor diagnostic module generating a dynamic threshold value based on the variation estimated signal variation value, for example, by applying a scale factor to the estimated signal variation value, and/or adding a constant offset to the variation value. The sensor diagnostic module compares the monitored signal variation value to the dynamic threshold value, and indicates the monitored sensor is in an erratic state when the monitored signal variation value is equal to or greater than the dynamic threshold value.

In one example, the system is configured as a powertrain system including a power inverter module operatively connected to a motor-generator including a stator, where the monitored sensor is a temperature sensor sensing an inverter temperature of the power inverter module, which may rapidly fluctuate, and the predictive sensor is a current sensor sensing the total current output of the stator. The stator total current is predictive of the inverter temperature, such that change in the stator total current signal sensed by the current sensor is predictive of change in the inverter temperature signal of the inverter temperature sensor, and such that the stator total current signal can be used to estimated the inverter temperature and/or to estimate change in the inverter temperature during system operation. By way of example, a powertrain including the power inverter module and motor-generator may be a powertrain of vehicle, which in one example is a powertrain of a hybrid electric vehicle.

The above features and advantages and other features and advantages of the present invention are readily apparent from the following detailed description of the best modes for carrying out the invention when taken in connection with the accompanying drawings.

DETAILED DESCRIPTION

Figure 1:
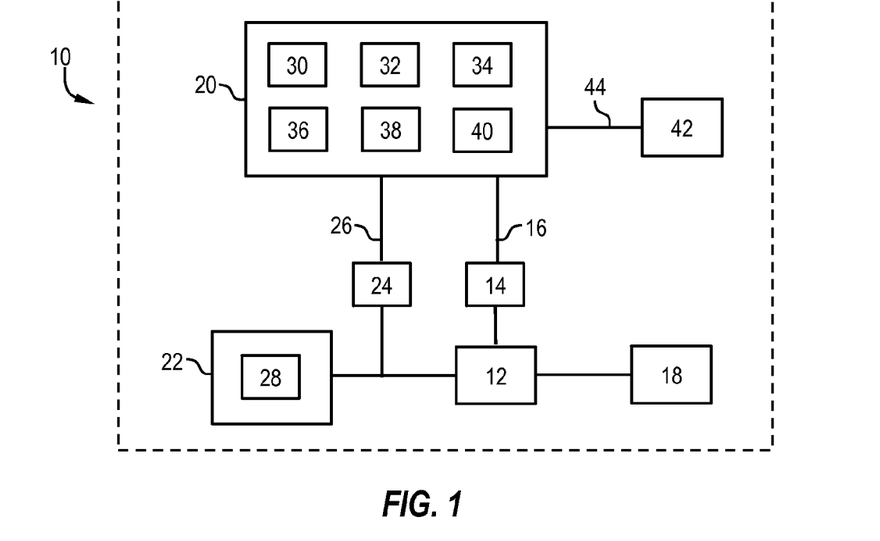
FIG. 1 is a schematic diagram showing an exemplary system for detecting a temperature sensor in an erratic state.
Figure 2:
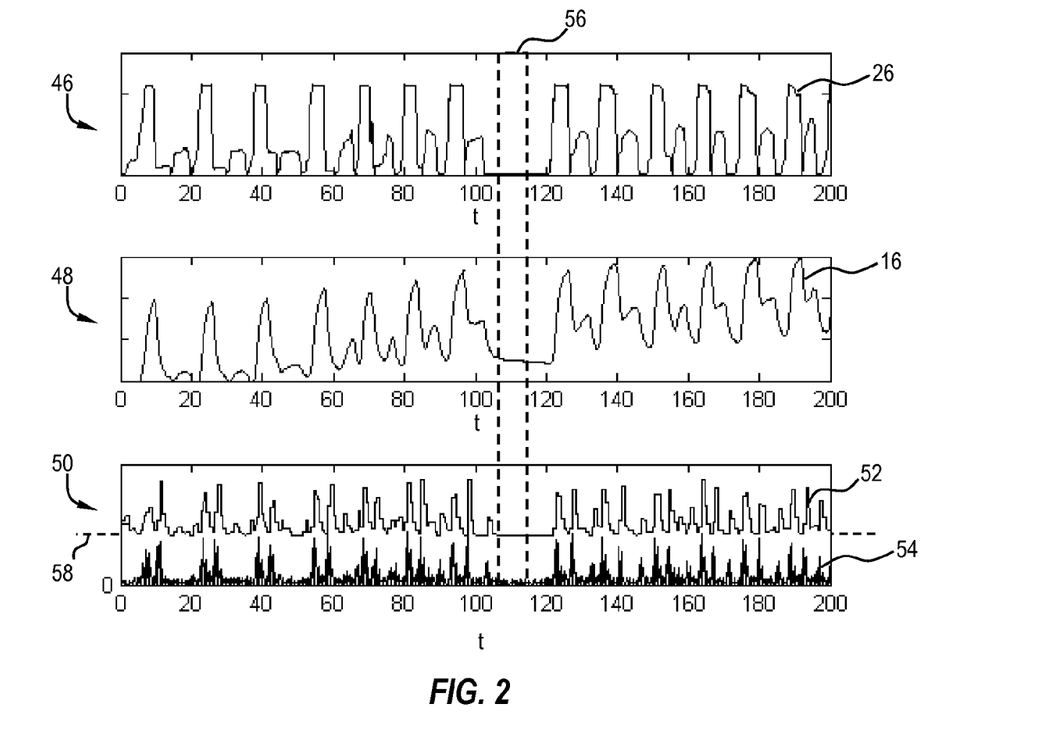
FIG. 2 is a graphical illustration of exemplary signal, temperature variation, and dynamic threshold values generated over time by the system of FIG. 1.
Figure 3:
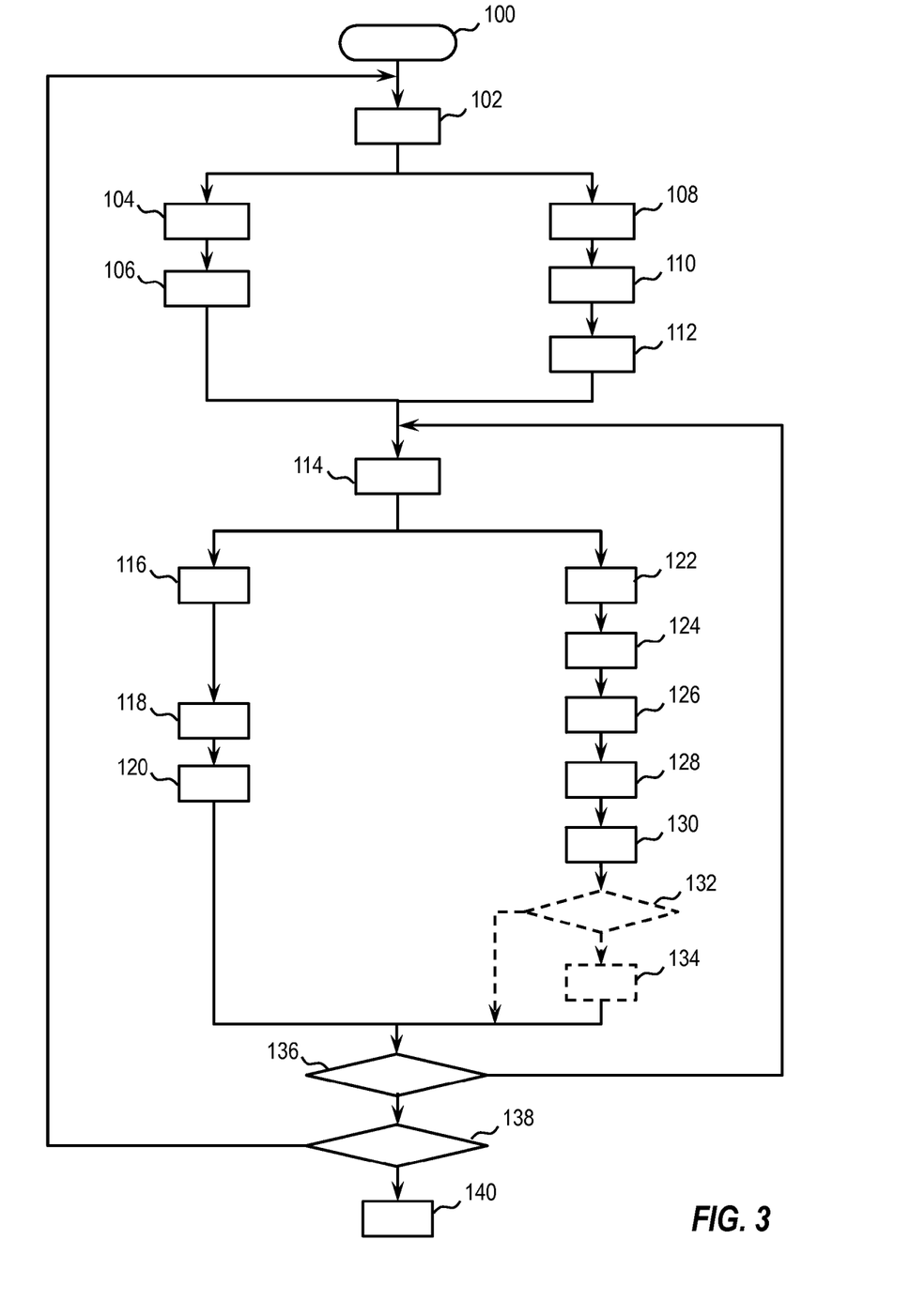
FIG. 3 is a schematic flow chart diagram of an algorithm or method for detecting a sensor in an erratic state, using the system of FIG. 1.

Referring to the figures, like numerals indicate like parts throughout the several views. The elements shown in FIGS. 1-3 are not necessarily to scale or proportion. Accordingly, the particular dimensions and applications provided in the drawings presented herein are not to be considered limiting. The following description is merely exemplary in nature and is in no way intended to limit the disclosure, its application, or uses. As used herein, the phrase at least one of A, B, and C should be construed to mean a logical (A or B or C), using a non-exclusive logical or. It should be understood that steps within a method may be executed in different order without altering the principles of the present disclosure. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A system and method for detecting an erratic sensor includes computing a variation value for each of a monitored signal and a predictive signal generated by a respective monitored sensor and a respective predictive sensor, wherein the predictive signal is predictive of the monitored signal based on system operating conditions, and the monitored signal is expected to generate a rapidly fluctuating signal based on system operating conditions. A dynamic threshold value is generated based on the predictive signal, and a variation value of the monitored signal is compared with the dynamic threshold value to determine if the monitored signal has become erratic. By using a dynamic threshold, rather than a constant threshold, to diagnose the monitored sensor, an erratic state of the monitored sensor can be distinguished from a rapidly fluctuating signal, providing a more sensitive means to detect an erratic sensor and which is less likely to generate a false indication of an erratic sensor relative to conventional methods of detecting an erratic sensor by comparison of sensor variation to a constant threshold. By way of non-limiting example, a sensor may become erratic as a result of a malfunctioning sensor, a faulty connection from the sensor to the control module or to the element being sensed by the sensor, or another electrical malfunction. A sensor which is erratic may affect control of the element being sensed by the sensor, and/or may affect control of the system which is being controlled based on the sensor signal.

FIG. 1 is a schematic diagram showing an exemplary system, generally indicated at 10, including an exemplary control module 20 for detecting an erratic state of a sensor, such as a first sensor 14, also referred to herein as a monitored sensor. The system includes the first sensor 14 and a second sensor 24 in operative communication with the control module 20. The second sensor 24 may also be referred to herein as a predictive sensor. The second sensor 24 may include a plurality of sensors (not shown) which may output a combination of physical and/or calculated signals combinable to define the output of the second sensor 24, e.g., combinable to define the second sensor signal 26. The system 10 further includes a first member 12 and a second member 22, also referred to herein, respectively, as a monitored member 12 and a predictive member 22. The first sensor 14 is configured to sense a condition of the first member 12 and to output a first sensor signal 16 to the control module 20, such that the first sensor signal 16 is defined by the sensed condition of the first member 12. The second sensor 24 is configured to sense a condition of the second member 22 and to output a second sensor signal 26 to the control module 20, such that the second sensor signal 26 is defined by the sensed condition of the second member 22.

In one example, the first or monitored member 12 is a power inverter module, and the first or monitored sensor 14 is a temperature sensor configured to sense an inverter temperature of the power inverter module 12, and the first or monitored signal 16 is an inverter temperature signal 16 output from the temperature sensor 14. The second or predictive member 22 is a motor-generator including a stator 28, and the second or predictive sensor 24 is a current sensor configured to sense the total current of the stator 28, where the motor-generator 22 is operatively connected to a power inverter module 12, and the second or predictive signal is a stator total current signal 26 output from the current sensor 24. In one example, the stator 28 may include multiple terminals (not shown), such that the current sensor 24 may includes a plurality of current sensors each measuring a current of a respective one of the terminals of the stator 28, where the outputs of the plurality of current sensors are combined to define the stator total current signal 26.

The system 10 and/or the first and second members 12, 22 are arranged such that during operation of the system 10 there exists a known relationship between the monitored sensor signal 16 and the predictive sensor signal 26, and an estimate of the monitored sensor signal 16 can be made based on the predictive sensor signal 26. FIG. 2, in a non-limiting example, includes a graph 46 showing the predictive sensor signal 26 over a time t, and a graph 48 showing the monitored sensor signal 16 over the same time t, where the graphs 46, 48 illustrate a known relationship between the monitored and predictive signals 16, 26. The predictive sensor signal 26 may be used to predict an estimated value of the monitored sensor signal 16. The estimated value of the monitored sensor signal 16 may be referred to herein as an estimated signal. In a non-limiting example, the control module 20 uses the predictive signal 26 and the estimated signal derived therefrom to monitor and/or diagnose the state of the monitored signal 16. By way of non-limiting example, the predictive relationship between the monitored and predictive sensor signals 16, 26 may be defined by one or more of an operating relationship between the monitored and predictive members 12, 22, an operating relationship between a third member 18 and one or both of the monitored and predictive members 12, 22, an operating environment shared by the monitored and predictive members 12, 22, a condition resultant from a shared command 44 received by the monitored and predictive members 12, 22, for example, from an input member 42, a condition resultant from a signal output by the control module 20 or other shared input, such as a command 44 received from an input member 42, etc. As such, the control module 20 can use the predictive signal 26 generated by the predictive sensor 24 to generate an estimated signal, where the estimated signal is an estimate of the monitored signal 16 generated by the monitored sensor 14. The examples provided herein are non-limiting, and other configurations are possible. For example, the estimated signal may be generated using a combination of predictive signals 26 generated by a combination of predictive sensors 24, where a known predictive relationship exists between the combination of predictive signals 26 and the monitored signal 16.

The control module 20 can use the estimated signal to generate an estimated signal variation value, which can then be used to generate a dynamic threshold value, shown at 52 in FIG. 2. In one example, the dynamic threshold value 52 is generated by applying a scale factor to the estimated signal variation value, where the scale factor may be a calibrated factor applied to adjust the sensitivity of the dynamic threshold value 52 to detect an erratic sensor state. For example, the scale factor may be a constant offset value added to the estimated signal variation value. The dynamic threshold value determined for a defined diagnostic time period may be compared with a monitored signal variation value (shown at 54 in FIG. 2) of the monitored signal 16 determined for the same diagnostic time period, to determine whether the monitored sensor 14 is operating in an erratic state during that same diagnostic time period. The monitored signal variation value 54 may be referred to herein as the monitored variation value 54.

By way of non-limiting example, the condition of the monitored member 12 sensed by the monitored sensor 14 may change rapidly during operation of the system 10, such that the monitored signal 16 output by the sensor 14 in response to the rapidly changing condition of the monitored member 12 sensed by the monitored sensor 14 will fluctuate rapidly, as shown in FIG. 2 48. The rapidly changing condition of the member 12 may be in response, for example, to rapid changes in a command 44 received from the input member 42. In one example, the input member 42 may be a torque control member such as a vehicle accelerator operatively connected to the control module 20, where the system 10 is a powertrain system of a vehicle including the accelerator 42, and the command 44 may be a torque command communicated to the control module 20 as input by the accelerator 42.

Under some vehicle operating conditions, including rapidly changing, aggressive or extreme use conditions, inputs to the accelerator 42 and the resultant torque commands 44 output from the accelerator 42 to the control module 20 may result in rapidly changes in powertrain operating conditions which may result in rapidly fluctuating inverter temperatures in the power inverter module 12. Referring to FIG. 2, graphs 46, 48 respectively show rapidly fluctuating values of signals 26, 16 over a time period t. Graph 50 shows the monitored variation value 54 of the monitored signal 16, calculated for a plurality of diagnostic time periods within the time period t, where the monitored variation value 54 increased in relationship to the magnitude of change over time of the monitored signal 16. For example, the monitored variation value 54 is relatively larger during diagnostic time periods where there is relatively greater change in the magnitude of the monitored signal value 16, and the monitored variation value 54 is relatively smaller during diagnostic time periods where there is relatively lesser change in the magnitude of the monitored signal value 16, for example, during diagnostic time periods occurring in a time interval 56. By sampling the monitored (inverter temperature) signal 16 and the predictive (stator total current) signal 26 at the same sample times during a diagnostic time period, a comparison of a dynamic threshold value 52 generated from samples of the predictive signal 26 taken during the diagnostic time period may be made to a monitored signal variation value 54 generated from samples of the monitored signal 16 taken during the same diagnostic time period, where the comparison of the dynamic threshold value 52 and the monitored signal variation value 54 for that diagnostic time period can be used to determine an erratic state of the monitored sensor 14 as distinguished from a rapidly fluctuating monitored signal 16, as such providing a more sensitive means to detect an erratic sensor state which is less likely to generate a false indication of an erratic sensor relative to conventional methods of detecting an erratic sensor by comparison of the monitored sensor variation to a constant threshold. As shown in graph 50 of FIG. 2, when the monitored sensor is in a non-erratic state, the monitored variation value 54 and dynamic threshold value 52 each fluctuate and vary in magnitude relative to the other, as would be expected given the dynamic threshold value 52 is derived from the estimated variation value, which is generated using estimated temperature values based on the predictive signal 26. It would be understood that during a specific diagnostic period, the monitored variation value 54 would be relatively larger when the monitored sensor 14 is in an erratic state as compared to a non-erratic state, such that when the monitored sensor 14 is in an erratic state the monitored variation value 54 would exceed the dynamic threshold value 52, to indicate the erratic state of the monitored sensor 14.

In some cases, for example, during the time interval 56 shown in FIG. 2, the operating conditions of the system 10 are in steady state and/or minimally changing, such that the predictive signal 26 and the monitored signal 16 in a non-erratic state each exhibit minimal fluctuation as shown in graphs 46 and 48, respectively. Under these conditions, a monitored signal variation value 54 generated based on the minimally fluctuating non-erratic monitored signal 16 would have a minimal value as shown in graph 50 for time interval 56. Likewise, an estimated variation value generated using an estimated temperature signal estimated based on the predictive signal 26 would, during the time interval 56, be minimal or close to zero, and the dynamic threshold value 52 generated using the estimated variation value would also be minimal or close to zero, and comparison of the generated minimal dynamic threshold value 52 to the minimal monitored variation value 54 could result in a false diagnosis of an erratic state of the monitored sensor 14. In this event, the generated dynamic threshold value 52 may be compared with a minimum threshold limit, shown at 58 in FIG. 2, and the dynamic threshold 52 set at the minimum threshold limit when the generated dynamic threshold value 52 (as generated from the estimated variation value) is less than the minimum threshold limit 58, such that the monitored variation value 54 is compared with the minimum threshold limit 58 to determine if the monitored sensor 14 is in an erratic state. The minimum threshold limit 58 may be a calibrated limit established as the minimum dynamic threshold value for use in diagnosing an erratic state of the monitored sensor 14, based on, for example, the configuration and/or expected operating parameters of the system 10, the configuration and/or expected operating parameters of the monitored sensor 14, etc. Further, as described previously, a scale factor, which may be a constant value, may be applied or added to the estimated signal variation value when determining the generated dynamic threshold value 52.

Referring again to FIG. 1, by way of non-limiting example, the system 10 may be a powertrain system configured such that the monitored member 12 is a power inverter module operatively connected to a second member 22 configured as a motor-generator and to a third member 18 configured as an energy storage device. The power inverter module 12, the motor-generator 22, and the energy storage device 18 are in electrical communication with the control module 20 and with each other. The motor-generator 22 includes a stator 28. In a non-limiting example, the powertrain system 10 may be a powertrain system for a vehicle (not shown), which may be an automotive or non-automotive vehicle. The vehicle may be a non-hybrid vehicle or a hybrid vehicle, such as an electric hybrid vehicle. The control module 20 may be a vehicle control module, such as a powertrain control module.

The motor-generator 22 can selectively function as a motor powered by energy provided by the energy storage device 18 or as a generator to generate alternating current (AC) energy to be stored in the energy storage device 18. The energy storage device 18, also referred to herein as a battery, may be a direct current (DC) battery, a multi-cell energy storage device, or other suitable storage device for storing electrical energy generated by the motor-generator 22 when the motor-generator 22 functions as a generator, and for providing energy to the motor-generator 22 when the motor-generator 22 functions as a motor. The power inverter module 12, also referred to herein as an inverter 12, can convert direct current (DC) provided by the battery 18 to alternating current (AC) to power the motor-generator 22 to function as a motor, and can convert alternating current (AC) generated by the motor-generator functioning as a generator to direct current (DC) for storage in the battery 18.

In the present example, the powertrain system 10 includes a monitored sensor 14 which senses an inverter temperature of the inverter 12 and outputs an inverter temperature signal 16, and further includes a predictive sensor 24 which senses a total current of the stator 28 and outputs a stator total current signal 26, which may be referred to herein as a stator current signal or a predictive signal. The inverter temperature and stator current sensors 14, 24 are in operative communication with the control module 20. The system 10 and/or the inverter 12 and the motor-generator 22 including the stator 28 are arranged such that there exists a known relationship between the inverter temperature sensor signal 16 and the stator current sensor signal 26 and such that an estimate of the inverter temperature signal, referred to herein as an estimated signal or an estimated temperature signal, can be generated from the stator current sensor signal 26 during operation of the powertrain system 10.

The control module 20 includes a processor 30, a memory 32, and a timer module 40. The memory 32 can include, by way of example, Read Only Memory (ROM), Random Access Memory (RAM), electrically-erasable programmable read only memory (EEPROM), etc., of a size and speed sufficient for executing the method described herein and for storing data which may include, for example, signal values, signal deviations, variation values, diagnostic or fault indicators, algorithms, etc. as described herein. The timer module 40 includes a clock cycle, and a timer and/or other time tracking mechanism which may be used to establish a predetermined sampling rate, to associate a clock time with a sample such as a sample signal value or with an indicator such as an erratic state indicator, to initiate and actuate a timer for a time period such as a diagnostic period, a sample time period, a diagnosis time, etc.

The system 10 further includes a signal deviation module 34, a variation determination module 36, and a sensor diagnostic module 38, each in operable communication with the control module 20. The signal deviation module 34 is configured to receive a signal from one or more sensors in the system 10, for example, from the monitored sensor 14 and/or from the predictive sensor 24, and to generate a sensor deviation value for that sensor based on the signal received from that sensor. The signal deviation module 34 is configured to perform sampling of the received signal, where in the present example the received signal is one of the monitored signal 16 and the predictive signal 26, to store sampled values of the received signal in the memory 32, and use one or more algorithms which may be included in the signal deviation module 34 to generate a signal deviation of the received signal using samples of a received signal taken at different times. The samples may be consecutive samples in a plurality of samples performed at a predetermined sampling rate. The predetermined sampling rate may be based on a clock cycle or sample time period generated by the timer module 40. Each sample of the received signal may be associated with the respective sample time of that sample and stored in the memory 32. The signal deviation module 34 may determine a difference between samples of the received signal performed at different sample times. The signal deviation module 34 may determine a signal deviation for each of the differences based on the magnitude of the difference between the samples performed at different sample times. The signal deviation module 34 may determine a plurality of signal deviations during a diagnostic period, including, for example, a first signal deviation based on signal samples performed at a first and a second time, a second signal deviation based on signal samples performed at a second and a third time, and so on. Each signal deviation may be stored in memory 32.

In a non-limiting example, as described for the method shown in FIG. 3, the signal deviation module 34 concurrently receives the monitored signal 16 and the predictive signal 26, and concurrently performs sampling of the each of the monitored signal 16 and the predictive signal 26, such that a sample time for the monitored signal 16 and the predictive signal 26 is the same time, and such that the sample of the monitored signal 16 and the sample of the predictive signal 26 taken at the same sample time represents the operating condition of the system 10 including the monitored member 12 and predictive member 22 then existing at that sample time. In FIG. 3 at steps 106 and 110, at a first sample time established by the timer module 40, the signal deviation module 34 concurrently performs a first sample of each of the monitored signal 16 and the predictive signal 26. At step 112, the signal deviation module 34 or control module 20 generates a first estimated signal based on the first sample of the predictive signal 26, where the first estimated signal is an estimate of the monitored signal 16 at the first sample time. Then, at a second sample time established by the timer module 40, shown in FIG. 3 at steps 116 and 122, the signal deviation module 34 concurrently performs a second sample of each of the monitored signal 16 and the predictive signal 26. At step 124, the signal deviation module 34 or control module 20 generates a second estimated signal based on the second sample of the predictive signal 26, where the second estimated signal is an estimate of the predictive signal 26 at the second sample time. The signal deviation module 34 may then determine a monitored signal deviation for the monitored signal 16 based on the difference between the monitored signal 16 sampled the first and second times, and may determine an estimated signal deviation for the estimated signal based on the difference between the first and second estimated signal estimated, respectively, from the predictive signal 26 sampled the first and second times.

In another example, the signal deviation module 34 may determine a signal deviation for the monitored signal 16 based on the magnitude of the difference between the first and second samples of the monitored signal 16, and may determine a signal deviation for the predictive signal 26 based on the magnitude of the difference between the estimated signals estimated from the first and second samples of the predictive signal 26. The method may return from step 136 to step 114 such that the signal deviation module 34 may continue to sample the each of the monitored signal 16 and the predictive signal 26 concurrently, at a sampling frequency or sample time determined by the timer module 40, and to continue to generate a plurality of signal deviations for each of the monitored signal 16 and the estimated signal based on determining the difference or a magnitude of the difference between monitored and estimated signals based on samples of the monitored signal 16 and predictive signal 26 taken at different sample times over a sample period until either a predetermined number of samples is performed or a predetermined sample time period has elapsed, at which point the method continues to step 138. For example, the signal deviation module 34 may determine a monitored signal deviation based on difference between a sample of the monitored signal 16 taken at a third time, and the sample of the monitored signal 16 taken at the second time, and may determine an estimated signal deviation based on difference between an estimated signal estimated from a sample of the predictive signal 26 taken at a third time, and the estimated signal estimated from the sample of the predictive signal 26 taken at the second time, and so on for subsequent samples taken at subsequent sample times, such that the signal deviation module 34 may generate a plurality of signal deviations for each of the monitored signal 16 and the estimated signal estimated from the predictive signal 26, each respective signal deviation corresponding to the respective sample time period including the respective sample times of the signal samples used to generate the respective sample deviation. The plurality of signal deviations may be stored in memory 32 and used by the variation determination module 36 to generate a plurality of variation values as described in further detail herein.

The variation determination module 36 is configured to and/or includes one or more algorithms to generate a signal variation value for a received signal, which may be, for example, one of the monitored signal 16 and the estimated signal estimated from the predictive signal 26, based on a plurality of signal deviations of the received signal. In one example, the signal variation value of the received signal may be a sum of the plurality of signal deviations of the received value. In another example, the signal variation value of the received signal may be an average of the plurality of signal deviations of the received signal. A first signal variation value may be generated for a received signal for a first diagnostic period, based on signal deviations generated during the first diagnostic period, for example, as shown in steps 102 through 138 of FIG. 3. Steps 102 through 138 may be repeated to generate a second signal variation value for the received signal for a second diagnostic period, based on signal deviations generated during the second diagnostic period. Steps 102 through 138 may be repeated in a looping fashion such that the variation determination module 36 may generate a plurality of signal variation values, each respective signal variation value corresponding to a respective diagnostic period. The variation values generated by the variation determination module 36 may be stored in the memory 32.

At the initiation of a diagnostic period, represented in FIG. 3 by steps 102 through 112, the variation value of each of the monitored signal 16 and estimated signal estimated from the predictive signal 26 may be initially set to a value of zero by the variation determination module 36, at steps 104, 108 respectively. After the first and the second samples are made of the monitored signal 16 (at steps 106 and 116) and the predictive signal 26 (at steps 110 and 122), a first monitored signal deviation is determined at step 118 for the monitored signal 16 based on the magnitude of the difference between the first and second samples of the monitored signal 16, and a first estimated signal deviation is determined at step 126 based on the magnitude of difference between the first estimated signal estimated at step 112 from the first sample of the predicted signal 26 taken at step 110, and the second estimated signal estimated at step 124 from the second sample of the predicted signal 26 taken at step 122. Subsequent signal deviations may be determined for the monitored signal 16 and the estimated signal estimated from the predicted signal 26 as the method represented in FIG. 3 loops repeatedly through steps 114 through 136, such that the variation value of the monitored signal 16 and the estimated signal may be increased by each respective signal deviation generated during the diagnostic period and stored in memory 32. For example, after a third sample of the monitored signal 16 and the predictive signal 26 is performed, a second monitored signal deviation value may be determined for the monitored signal 16 based on the magnitude of the difference between the second and the third samples of the monitored signal 16, and a second estimated signal deviation value may be determined for the estimated signal based on the magnitude of the difference between the second and third estimated signal predicted from the second and the third samples of the predictive signal 26. The variation value of each respective one of the monitored signal 16 and the estimated signal may be increased again by the respective second signal deviation and stored in the memory 32.

In one example, the variation value of each of the monitored signal 16 and the estimated signal 26 may continue to be increased until a predetermined number of samples have been performed, thus completing a diagnostic period. When the number of samples is greater than the predetermined number of samples, the diagnostic period is reinitialized, for example, by resetting the number of samples to zero, and resetting the variation value of each of the monitored signal and the estimated signal to a value of zero prior to repeating the sample sequence for a subsequent diagnostic period.

In another example, the variation may continue to be increased until a predetermined diagnosis time has elapsed. The timer module 40 may initialize a timer that increments based on the clock cycle. When the timer value is greater than or equal to the predetermined diagnosis time, the diagnostic period is reinitialized, for example, by resetting the variation value to a value of zero prior to repeating the sample sequence for the predetermined diagnosis time during a subsequent diagnostic period.

In another example, the variation value may be based on a predetermined total number of signal deviations. For example only, the variation value may be a rolling sum and/or average of the predetermined total number of signal deviations such as X. When an X+1 signal deviation is determined, the first signal deviation of the rolling sum may be removed from the variation value determination, such that on a rolling basis, the variation value determination is based on X number of signal deviations.

The sensor diagnostic module 38 is configured to store a dynamic threshold value 52 generated at step 130 for use in determining whether the monitored sensor 14 is in an erratic state. The sensor diagnostic module 38 at step 138 compares, for each diagnostic time period, the dynamic threshold value 52 generated at step 130 to the monitored variation value 54 generated at 120 during that same diagnostic period, to determine whether the monitored sensor 14 is in an erratic state. For example, in the method shown in FIG. 3, at step 130 one of the sensor diagnostic module 38 and the variation determination module 36 generates a dynamic threshold value 52 based on the estimated variation value generated at step 128. The dynamic threshold value 52 may be generated at step 130, for example, by applying a scale factor to the estimated variation value from step 128. The estimated variation value may be, in one example, multiplied by the scale factor, or otherwise mathematically manipulated by the scale factor to generate the dynamic threshold value 52. The scale factor may be a calibrated value for the system 10 and/or the monitored sensor 14. The estimated variation value may, in another example, have a constant value added to it. The constant value may be a calibrated value for the system 10 and/or the monitored sensor 14. At an optional step 132, the dynamic threshold value 52 generated at step 130 is compared to a minimum threshold limit 58, and if the generated dynamic threshold value 52 is less than the minimum threshold limit 58, the dynamic threshold value 52 is adjusted to the minimum threshold limit 58 at step 134, and the method proceeds to step 136.

At step 136, the control module 20 determines whether the diagnostic time period is completed, for example, by comparing the diagnosis time which has elapsed since initializing a timer of the timer module 40 at step 102 to a predetermined diagnosis time required to complete a diagnostic time period, and/or by comparing the number of samples performed of the monitored and predictive signals 16, 26 with a predetermined number of samples required to complete a diagnostic time period. If the diagnostic time period is not yet complete, the method returns to step 114. At step 114 the timer of the timer module 40 is incremented and/or the sample count is incremented, and the method continues with the monitored signal 16 and predictive signal 26 being sampled concurrently at steps 116, 122 respectively.

If the diagnostic time period is complete, the method continues to step 138 and the sensor diagnostic module 38 compares the monitored variation value 54 to the dynamic threshold value 52, to determine whether the monitored signal 16 is in an erratic state. When the monitored variation value 54 is equal to or greater than the dynamic threshold value 52, the sensor diagnostic module 38 determines the monitored sensor 14 is in an erratic state and may generate an indicator to indicate the monitored sensor 16 is in an erratic state.

The examples provided herein are non-limiting, and it would be understood that other configurations of modules may be used in the system 10. For example, one or more of the control module 20, the signal deviation module 34, a variation determination module 36, and a sensor diagnostic module 38 may be configured to perform the functions of one or more of another of the control module 20, the signal deviation module 34, a variation determination module 36, and a sensor diagnostic module 38, etc. One or more of the sensors 14, 24 and the sensed members 12, 22 may be in operative communication with the control module 20 and/or one or more of the other modules 34, 36, 38.

Referring again to FIG. 3, an exemplary high-level diagram of a method to diagnose a sensor which is in an erratic state is shown. The method begins with a start or initialization step indicated at 100, at which time the method begins monitoring operating conditions of the system 10 including the monitored sensor 14 and the predictive sensor 24. Initialization of the method at step 100 may be concurrent with initiating operation of the system 10. For example, and referring to the powertrain system 10 shown in FIG. 2, initiating operation of the powertrain 10 by starting a vehicle including the powertrain 10 may initialize the method beginning with step 100 shown in FIG. 3. In another example, step 100 may be initialized in response to specific conditions being met by the system 10, such as detection of a signal output from one or both of the monitored sensor 14 and the predictive sensor 24. Alternatively, the method 100 may run constantly and/or loop continuously whenever the system 10 is in use.

At step 102 a predetermined diagnostic period is initiated, which may include initializing a timer of the timer module 40 to zero, for example, such that the diagnostic period is defined by a diagnosis time, and/or resetting a sample counter in the control module 20, for example, such that the predetermined diagnostic period is defined by a predetermined number of samples performed of the signals 16, 26. At step 104, a monitored signal variation value 54 of the monitored sensor 14 is initialized to a value of zero. Similarly, at step 108, an estimated signal variation value generated from the predictive sensor 24 is initialized to a value of zero. At step 106, which occurs concurrently with step 110 at a first time during the diagnostic period, the signal deviation module 34 performs a first sample of the monitored signal 16 at the first time, and stores the sample in memory 32. At step 110, which occurs concurrently with step 106, the signal deviation module 34 performs a first sample of the predictive signal 26 at the first time and may store the sample in the memory 32. As step 112, the signal deviation module 34 generates a first estimated signal based on the first sample of the predictive signal 26 performed at the first time, such that the estimated signal is an estimate of the monitored signal 16 at the first time. The first estimated signal is stored the estimated signal in the memory 32 associated with the first time.

At step 114 the timer is incremented, for example, by the timer module 40 to a second time and the method proceeds to steps 116 and 122, which occur concurrently. At step 116, the signal deviation module 34 performs a second sample of the monitored signal 16 at the second time during the diagnostic period, where the second time and the first time are different times. At step 122, at the second time and concurrent with step 116, the signal deviation module 34 performs a second sample of the predictive signal 26. At step 124, the signal deviation module 34 generates a second estimated signal based on the second sample of the predictive signal 26 performed at the second time, such that the estimated signal is an estimate of the monitored signal 16 at the second time. The second estimated signal is stored the estimated signal in the memory 32 associated with the second time.

At steps 118 and 126, the signal deviation module 34 generates a first signal deviation value for each of the monitored signal 16 and the estimated signal. The signal deviation module 34 at step 118 generates the first signal deviation value for the monitored signal 16, for example, by determining the magnitude of the difference between the first sample of the monitored signal 16 taken at step 106 and the second sample of the monitored signal 16 taken at step 116. The signal deviation module 34 at step 126 generates the first signal deviation value for the estimated signal, for example, by determining the magnitude of the difference between the first estimated signal generated from the first sample of the predictive signal 16 taken at step 110 and the second estimated signal generated from the second sample of the predictive signal 26 taken at step 122.

At steps 120 and 128, the variation determination module 36 determines a variation value for each of the monitored signal 16 and the estimated signal. The monitored variation value 54 determined based on the monitored signal 16 and the estimated variation value determined based on the estimated signal may be stored in the memory 32.

At step 130 one of the sensor diagnostic module 38 and the variation determination module 36 generates a dynamic threshold value 52 based on the estimated variation value generated at step 128. The dynamic threshold value 52 may be generated at step 130, for example, by applying a scale factor to the estimated variation value from step 128. The estimated variation value may be, in one example, multiplied by the scale factor, or otherwise mathematically manipulated by the scale factor to generate the dynamic threshold value 52. The scale factor may be a calibrated value for the system 10 and/or the monitored sensor 14. In one example, the scale factor may be a constant offset value added to the estimated variation value during generation of the dynamic threshold value 52. At an optional step 132, the dynamic threshold value 52 generated at step 130 is compared to a minimum threshold limit 58, and if the generated dynamic threshold value 52 is less than the minimum threshold limit 58, the dynamic threshold value 52 is adjusted to the minimum threshold limit 58 at step 134, and the method proceeds to step 136.

At step 136, the control module 20 determines whether the diagnostic time period is completed, for example, by comparing the diagnosis time which has elapsed since initializing a timer of the timer module 40 at step 102 to a predetermined diagnosis time required to complete a diagnostic time period, and/or by comparing the number of samples performed of the monitored and predictive signals 16, 26 with a predetermined number of samples required to complete a diagnostic time period. For example, where the diagnostic period is defined by a predetermined diagnosis time, at step 136 the control module 20 and/or the timer module 40 determines if the timer value has reached the diagnosis time. If the timer value meets or exceeds the predetermined diagnosis time, the method proceeds to step 138. If the timer value is less than the predetermined diagnosis time, the method returns to step 114 and the timer is incremented at step 114 to a third time, and the method proceeds to steps 116 and 122, which occur concurrently. Alternatively, where the diagnostic period is defined by a predetermined number of samples, at step 136 the control module 20 and/or the signal deviation module 34 determined if the number of samples performed has met a predetermined number of samples required for the diagnostic period. If the number of samples performed meets the predetermined number of samples required for the diagnostic period, the method proceeds to step 138. If the number of samples performed is less than the predetermined number of samples, the method loops back, e.g., returns to step 114, where the number of steps performed is incremented and the timer is incremented to a third time, and the method proceeds to steps 116 and 122, which occur concurrently.

At step 116, the signal deviation module 34 performs a third sample of the monitored signal 16 at the third time. At step 122, at the third time and concurrent with step 116, the signal deviation module 34 performs a third sample of the predictive signal 26. The third time, the second time, and the first time are different times. The first, second, and third times may be consecutive times. At step 124, the signal deviation module 34 generates a third estimated signal based on the third sample of the predictive signal 26 performed at the third time, such that the estimated signal is an estimate of the monitored signal 16 at the third time. The third estimated signal is stored the estimated signal in the memory 32 associated with the third time.

At steps 118 and 126, the signal deviation module 34 generates a second signal deviation value for each of the monitored signal 16 and the estimated signal. The signal deviation module 34 at step 118 generates the second signal deviation value for the monitored signal 16, for example, by determining the magnitude of the difference between the second sample of the monitored signal 16 taken at step 116 at the second time and the third sample of the monitored signal 16 taken at step 116 at the third time. The signal deviation module 34 at step 126 generates a third signal deviation value for the estimated signal, for example, by determining the magnitude of the difference between the second estimated signal generated from the second sample of the predictive signal 16 taken at step 122 at the second time and the third estimated signal generated from the third sample of the predictive signal 26 taken at step 122 at the third time.

At step 120, the variation determination module 36 regenerates the monitored variation value 54 based on the first and second monitored signal deviations and may store the monitored variation value 54 in memory 32. At step 128, the variation determination module 36 regenerates the estimated variation value based on the first and second estimated signal deviations and may store the estimated variation value in memory 32. In one example, the variation value for each respective one of the monitored signal 16 and the estimated signal is determined by a sum of the signal deviation values of the respective one of the monitored signal 16 and the estimated signal generated during the diagnostic period. In another example, the variation value for each respective one of the monitored signal 16 and the estimated signal is determined by an average of the signal deviation values of the respective one of the monitored signal 16 and the estimated signal generated during the diagnostic period.

The method again proceeds to step 136, to again determine whether the diagnostic period is complete, for example, by determining if the timer value initialized at step 102 has reached the diagnosis time, and/or if the number of samples performed has reached the predetermined number of samples required by the diagnostic period. If the diagnosis time and/or number of samples performed has not met the requirement to complete the diagnostic period, the method returns to step 114 and repeats as previously described. If the diagnosis time and/or number of samples performed has met the requirement to complete the diagnostic period, the method proceeds to step 138.

At step 138 and the sensor diagnostic module 38 compares the monitored variation value 54 to the dynamic threshold value 52, to determine whether the monitored signal 16 is in an erratic state. When the monitored variation value 54 is equal to or greater than the dynamic threshold value 52, the sensor diagnostic module 38 determines the monitored sensor 14 is in an erratic state and may generate an indicator to indicate the monitored sensor 16 is in an erratic state.

The method 100 may run constantly and/or loop continuously whenever the system 10 is in use. It would be understood that modifications and variations of the present invention are possible in light of the above teachings and may be practiced otherwise than as specifically described while within the scope of the appended claims. For example, the method and system described herein is not limited to temperature sensors, and can be adapted for detection of an erratic state of any type sensor which is subject to rapidly fluctuation conditions under normal operation. In addition, the reference numerals in the claims are merely for convenience and are not to be read in any way as limiting.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of diagnosing an erratic sensor, the method comprising:
   receiving a monitored signal from a monitored sensor;
   receiving a predictive signal from a predictive sensor;
   determining an estimated signal based on the predictive signal;
   wherein the estimated signal is an estimate of the monitored signal;
   determining a monitored variation value of the monitored signal;
   determining a estimated variation value of the estimated signal;
   generating a dynamic threshold value based on the estimated variation value;
   determining a state of the monitored sensor based on a comparison of the monitored variation value and the dynamic threshold value;
   wherein the monitored variation value and the estimated variation value are determined over a diagnostic time period which is the same diagnostic time period for:
   sampling the monitored signal upon which the monitored variation value is based; and
   sampling the predictive signal upon which the estimated variation value is based.

2. The method of claim 1, wherein:
   determining the monitored variation value further comprises:
   determining a first monitored signal deviation and determining a second monitored signal deviation; and
   determining the estimated variation value of the estimated signal further comprises:
   determining a first estimated signal deviation and a second estimated signal deviation.

3. The method of claim 2, wherein:
   the monitored variation value is defined by a sum of the first and the second monitored signal deviations; and
   the estimated variation value defined by a sum of the first and the second estimated signal deviations.

4. The method of claim 2, wherein:
the monitored variation value is defined by an average of the first and the second monitored signal deviations; and
the estimated variation value is defined by an average of the first and the second estimated signal deviations.

5. A method of diagnosing an erratic sensor, the method comprising:
receiving a monitored signal from a monitored sensor;
receiving a predictive signal from a predictive sensor;
determining an estimated signal based on the predictive signal;
wherein the estimated signal is an estimate of the monitored signal;
determining a monitored variation value of the monitored signal;
determining an estimated variation value of the estimated signal;
generating a dynamic threshold value based on the estimated variation value;
determining a state of the monitored sensor based on a comparison of the monitored variation value and the dynamic threshold value;
wherein determining the monitored variation value further comprises:
  determining a first monitored signal deviation; and
  determining a second monitored signal deviation;
wherein determining the estimated variation value of the estimated signal further comprises:
  determining a first estimated signal deviation and a second estimated signal deviation;
wherein:
  the first monitored signal deviation is determined over a first sample time period;
  the first estimated signal deviation is determined over the first sample time period; and
  the second monitored signal deviation is determined over a second sample time period;
  the second estimated signal deviation is determined over the second sample time period.

6. The method of claim 2, further comprising:
sampling the monitored signal at a first time to provide a first monitored signal value;
sampling the monitored signal at a second time to provide a second monitored signal value;
sampling the monitored signal at a third time to provide a third monitored signal value;
sampling the predictive signal at the first time to provide a first predictive signal value;
estimating a first estimated signal value based on the first predictive signal value;
sampling the predictive signal at the second time to provide a second predictive signal value;
estimating a second estimated signal value based on the second predictive signal value;
sampling the predictive signal at the third time to provide a third predictive signal value;
estimating a third estimated signal value based on the third predictive signal value;
wherein:
  the second time follows the first time and is different than the first time;
  the third time follows the second time and is different than the second time;
  the first monitored signal deviation is based on a magnitude of a difference between the first monitored signal value the second monitored signal value;
  the second monitored signal deviation is based on a magnitude of a difference between the third monitored signal value the second monitored signal value;
  the first estimated signal deviation is based on a magnitude of a difference between the first estimated signal value the second estimated signal value; and
  the second estimated signal deviation is based on a magnitude of a difference between the third estimated signal value the second estimated signal value.

7. The method of claim 6, wherein the first time and the second time are consecutive times based on a predetermined sampling rate.

8. The method of claim 1, further comprising:
determining the monitored sensor is in an erratic state when the variation value of the monitored signal is greater than or equal to the dynamic threshold value.

9. The method of claim 1, further comprising:
applying a scale factor to the estimated variation value to generate the dynamic threshold value.

10. A method of diagnosing an erratic sensor, the method comprising:
receiving a monitored signal from a monitored sensor;
receiving a predictive signal from a predictive sensor;
determining an estimated signal based on the predictive signal;
wherein the estimated signal is an estimate of the monitored signal;
determining a monitored variation value of the monitored signal;
determining an estimated variation value of the estimated signal;
generating a dynamic threshold value based on the estimated variation value;
determining a state of the monitored sensor based on a comparison of the monitored variation value and the dynamic threshold value;
comparing a constant threshold limit and the dynamic threshold value based on the estimated variation value; and
adjusting the dynamic threshold value to the greater of the constant threshold limit and the dynamic threshold value based on the estimated variation value.

11. The method of claim 1, further comprising:
the monitored sensor sensing an inverter temperature of an inverter;
the predictive sensor sensing a total stator current of a stator;
wherein the inverter is operatively connected to the stator such that the total stator current is predictive of the inverter temperature during operation of the inverter and the stator; and
a control module in communication with the monitored sensor and the predictive sensor and generating the estimated signal based on the predictive signal;
wherein the estimated signal is an estimate of the inverter temperature based on the total stator current.

* * * * *